Figure 1:
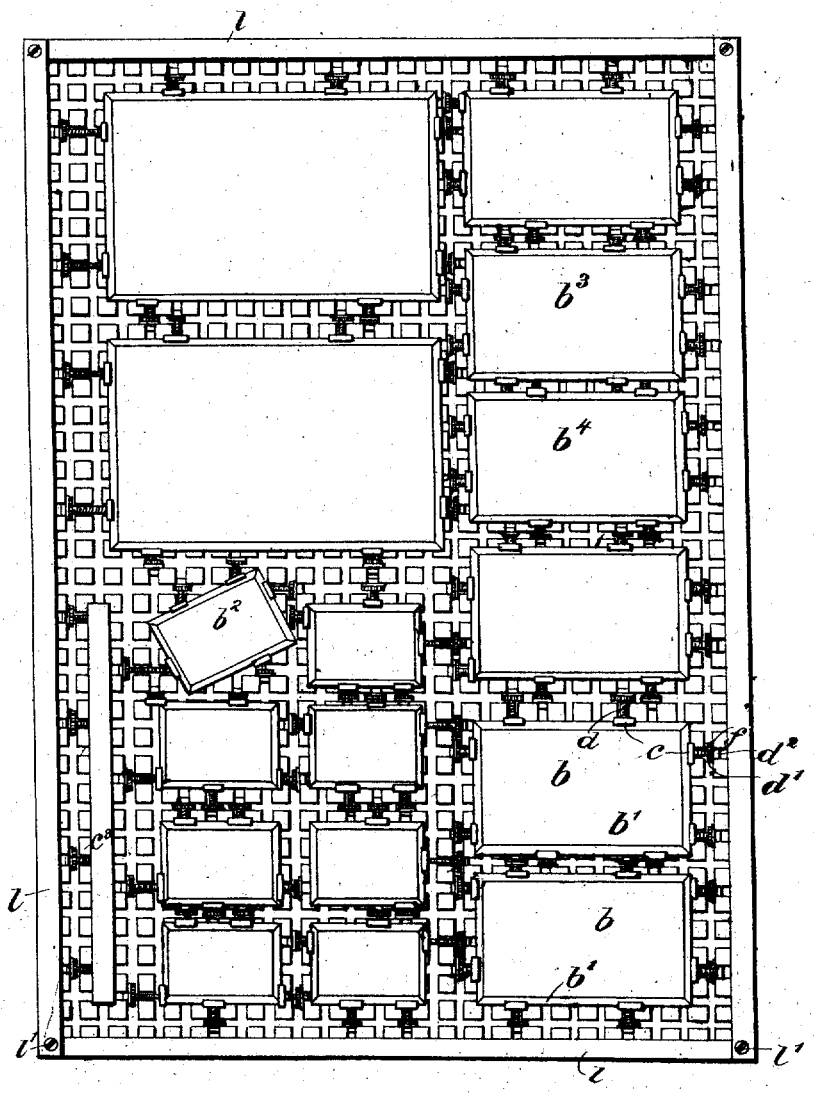

No. 12,404. REISSUED NOV. 7, 1905.

C. F. ROCKSTROH.

PRINTING PLATE HOLDER.

APPLICATION FILED APR. 19, 1905.

4 SHEETS—SHEET 1.

WITNESSES

Chas. F. Smith

A. H. Serrell

INVENTOR

Charles F. Rockstroh

PER Harold Serrell

ATTY.

No. 12,404. REISSUED NOV. 7, 1905.

C. F. ROCKSTROH.

PRINTING PLATE HOLDER.

APPLICATION FILED APR. 19, 1905.

4 SHEETS—SHEET 2.

WITNESSES

Leopold Hess

Chas. H. Smith

INVENTOR

Charles F. Rockstroh

PER Harold Terrell

ATTY

No. 12,404. REISSUED NOV. 7, 1905.

C. F. ROCKSTROH.

PRINTING PLATE HOLDER.

APPLICATION FILED APR. 19, 1905.

4 SHEETS—SHEET 3.

WITNESSES

Leopold Sen.

Chas. H. Smith

INVENTOR

Charles F. Rockstroh.

PER Harold Serrell

ATTY

No. 12,404. REISSUED NOV. 7, 1905.

C. F. ROCKSTROH.

PRINTING PLATE HOLDER.

APPLICATION FILED APR. 19, 1905.

4 SHEETS—SHEET 4.

WITNESSES

Chas. H. Smith

A. L. Serrell

INVENTOR

Charles F. Rockstroh

PER Harold Serrell

ATTY

UNITED STATES PATENT OFFICE.

CHARLES F. ROCKSTROH, OF BROOKLYN HILLS, NEW YORK, ASSIGNOR TO ROCKSTROH MANUFACTURING COMPANY, A CORPORATION OF NEW JERSEY.

PRINTING-PLATE HOLDER.

No. 12,404. Specification of Reissued Letters Patent. Reissued Nov. 7, 1905.

Original No. 750,395, dated January 26, 1904. Application for reissue filed April 19, 1905. Serial No. 256,497.

*To all whom it may concern:*

Be it known that I, CHARLES F. ROCKSTROH, a citizen of the United States, and a resident of Brooklyn Hills, in the county of Queens and State of New York, have invented certain new and useful Improvements in Printing-Plate Holders, of which the following is a specification.

This invention relates to an improved holder for stereotype, electrotype, or other printing-plates by which said plates, whether of large or small size, are securely held in position for printing.

The invention consists of a printing-plate holder comprising a block having a series of parallel cross-shaped grooves or slots in its upper side at right angles with the sides of the block and being separated from each other by spaces corresponding to the "point system" of type-space measurement and in providing detachable clamps therefor and each of which has a lateral screw-plate-adjusting device and an automatic locking device for connecting the same in the grooves or slots of the said block.

The invention further consists in providing self-securing "margin-bars," which are detachably fitted into the slots of the holder and which act as side and end stops for the plate.

The invention also consists in providing the margin-bars with a rack means of lateral adjustment when placed in the slots of the holder.

It also consists in providing suitable supports of novel construction and adapted to support any portion of a plate that may lie over any of the slots in the holder in case the plate requires support during the operation of printing.

It further consists of such other novel construction as will be more fully described in the following specification and more especially pointed out in the claims.

The object of my invention is to provide a plate-holder that by its aid a person can quickly and securely attach a stereotype or similar plate or plates in any position thereon and have the means of obtaining therefor the greatest accuracy of lateral adjustment, while the alinement of the plate or plates can be determined by the right-angled position of the slots with reference to the edges of the holder and apply and utilize the point system of type measurement in connection therewith.

My object is also to provide detachable supports for any portions of a plate or plates that may be over a slot or slots in the holder and not otherwise supported by the holder.

The objects are further to utilize the advantages of the margin-bars, the sectional principle of construction of the holder, the rapid clamp-releasing principle of a hand rack-bar, and such other objects as will be more fully explained in the following specification, which is to be taken together with the accompanying drawings, and in which similar letters refer to similar parts throughout the several views.

Figure 3:
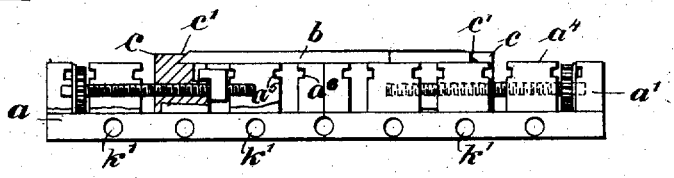
Figure 2:
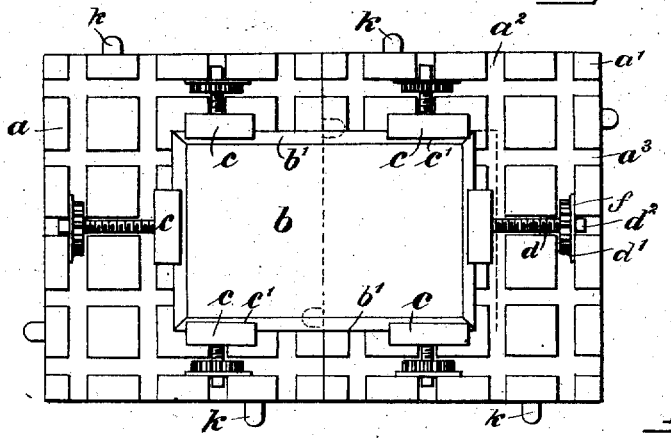
Figure 6:
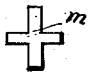
Figure 8:
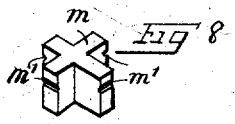
Figure 4:
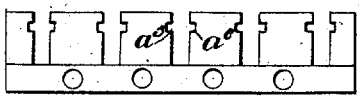
Figure 7:
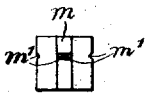
Figure 5:
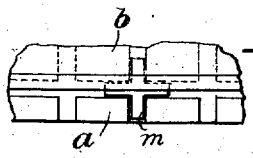
Figure 11:
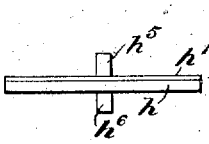
Figure 12:
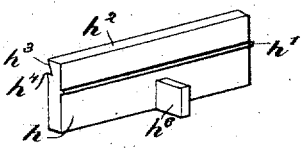
Figure 10:
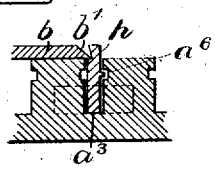
Figure 9:
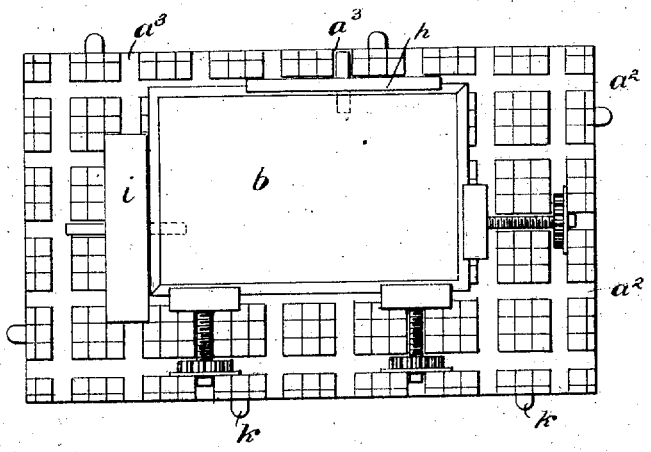
Figure 13:
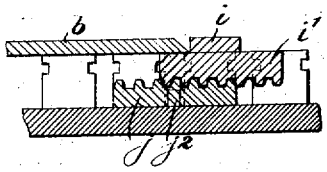
Figure 14:
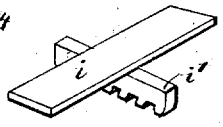
Figure 15:
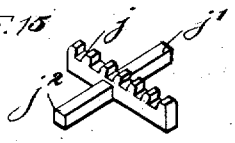
Figure 16:
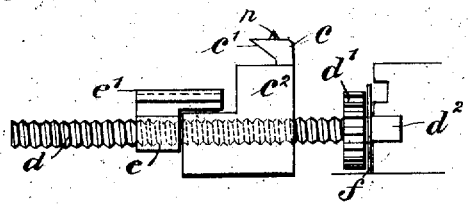
Figure 18:
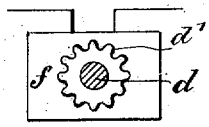

In the drawings, Figure 1 represents a top or plan view of a plate-holder made in sections with plates secured thereto and being made according to my improvement. Fig. 2 represents a top view of the holder in two sections with a plate secured thereto by means of the clamp devices. Fig. 3 is a side elevation of Fig. 2, shown partly in section that the application of the clamps may be more clearly seen and understood. Fig. 4 is an end view of Fig. 2, but with the plate and clamp mechanism removed therefrom. Fig. 5 shows a part of a plate and holder with a support in position therein and in which the edge of the plate projects over one of the slots in the holder. Figs. 6 and 7 are top and side views, respectively, of a support, and Fig. 8 is a perspective view of the same. Fig. 9 shows a top view of a holder with a plate thereon and being provided with a side margin-bar and an end margin-bar and clamps. Fig. 10 is a vertical sectional view of a side margin-bar in position in a slot in the holder and an edge of a plate in contact therewith. Figs. 11 and 12 are top and side perspective views, respectively, of the side margin bars or stops shown in Figs. 9 and 10. Fig. 13 is an end vertical sectional view of the end margin bar or stop mechanism, shown also in Fig. 9. Figs. 14 and 15 are perspective views of the end-margin-bar-adjustment mechanism, also shown in Figs. 9 and 10. Figs. 16, 17, 18, and 19, respectively, are side, top, end, and front views of the clamp mechanism and in enlarged proportions for purposes of clearness of illustration. Fig. 20 is a side elevation of the hand rack-bar by means of which the clamp-screw mechanism is operated.

In the drawings, *a a'* are sections of the plate-holder, having the vertical grooves or slots $a^2$ $a^3$ twelve points, or one pica, wide and forty-eight points, or four picas, between centers opening in from the top $a^4$ of the holder and having side slots $a^5$ $a^6$ through their entire length.

Figure 17:
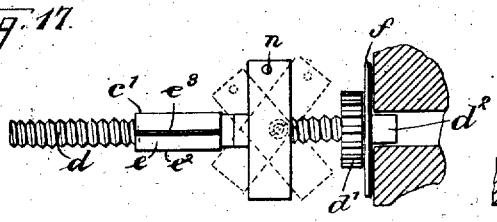

$b$ $b$ represent plates in position upon the holder and secured thereto by the clamps $c$ $c$, the edges $b'$ $b'$ of which are beveled in the usual manner and the lips $c'$ $c'$ of the clamps $c$ $c$ being correspondingly shaped to fit down upon and make contact with the edges of the plates. Each lower or body portion $c^2$ of the clamp $c$ is longitudinally apertured and interiorly threaded to receive and fit the screw $d$, having the pinion $d'$ secured thereto (or made integral therewith) near the head $d^2$. The screw $d$ has also a threaded connection with the tumbler $e$ and is provided with a washer $f$, and all these parts are made of such dimensions as will admit of the whole device being dropped freely into the slots $a^2$ $a^3$, as seen in Figs. 1, 2, 3, 9, and 19, respectively, or removable by lifting upward therefrom, as may be desired. A rack-bar $g$, provided with a handle $g'$, meshes with pinions $d'$ $d'$ of the clamp-screws $d$ $d$ and is the means provided to turn the screws when they are in proper position in the slots of the holder and the plates are to be secured thereto or adjusted thereon or removed therefrom, as may be desired. The clamp $c$ may have a swivel connection with the threaded portion $c^2$, as shown in Figs. 1 and 17, when a plate is to be set at an angle on the holder, as shown by plate $b^2$ in Fig. 1. The clamp may also be made of any desired length and have two or more screws connected thereto, as shown by $c^3$ in Fig. 1.

Figure 19:
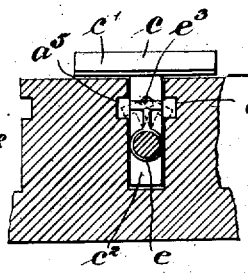
Figure 20:
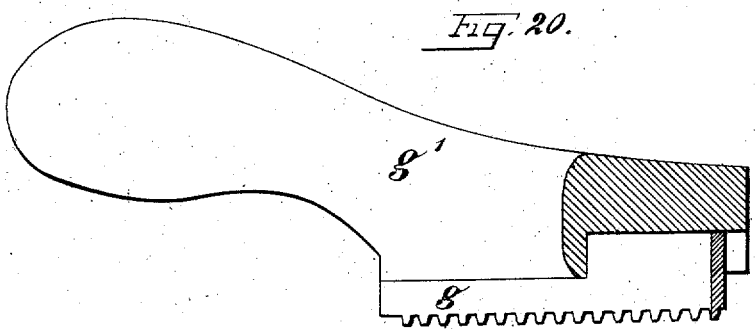

The tumbler $e$ is provided with lateral flanges $e'$ $e^2$, which are in registering position with the side slots $a^5$ $a^6$ of the slots $a^2$ $a^3$ and so arranged as to fall into either of said side slots, according as the screw $d$ may be turned in the operation of adjusting the clamp mechanism against the plate and as indicated by the dotted lines in Fig. 19. When the tumbler $e$ is in such a position, the screw $d$ and the clamp $c$ are prevented from rising up out of the clamp-slot $a^3$, while the lip $c'$ of the clamp $c$ will draw down the plate upon the top of the holder, and thus hold it firmly thereon. The washer $f$ between the pinion $d'$ and the head $d^2$ of the screw $d$, which is larger than the pinion and may be of any desired shape, is intended to take the back thrust of the screw and provide a smooth seat for the pinion to work against and to keep the pinion clear of the bottom of the slot. A notch $e^3$ in the upper surface of the tumbler $e$ is provided that the tumbler may be moved into a vertical position by the aid of a tool of any kind suitable for the purpose, that the whole clamp mechanism may be removed by lifting the same vertically and bodily from the slot in the holder in which it is placed whenever it is necessary to do this.

The tumbler $e$ acts as a detent for the clamp by engaging in either of the lateral slots of the main vertical slot in which the device is placed. The rotation of the screw $d$, by means of which the tumbler $e$ is connected with the clamp $c$, moves the tumbler into one or the other of the lateral slots $a^5$ $a^6$ in the vertical slot, according to the direction in which the screw may be turned, as shown by the dotted lines in Fig. 19. The tumbler can be made in any shape that will provide a shoulder or abutting surface that will register and engage with corresponding shoulders or surfaces that may be provided in the vertical slots in the plate-holder or so that it will otherwise impinge and bind against a side or sides of the vertical slots, and thus secure the clamp to the holder. The tumbler and clamp may also be connected together in any manner in which the tumbler will detachably bind the clamp in a slot to the holder, as I do not limit the scope of my invention in this respect to the particular form of construction of engaging or tumbler mechanism herein shown and described. The clamp devices can only be inserted into the clamp-slots at the points of intersection of the latter with each other in the holder, as the transverse plane of the pinions $d'$ $d'$ and washers $f$ $f$ with reference to the screws $d$ $d$ necessitates this method of their manipulation and adjustment to be operative and secure the clamps to the holder.

The side margin bar or stop $h$ (shown in position in the holder in Fig. 9) takes the side thrust of the opposite clamps upon the plate held between them, and the longitudinal rib $h'$ on the side of it is in registering position with a corresponding side slot $a^6$ in the clamp-slot $a^2$ of the holder, and the stop is thus prevented from rising up out of it whenever the plate is held by the clamp mechanism against it, as seen in Figs. 9 and 10. The upper edge $h^2$ of the stop $h$ has a projecting lip $h^3$, and under which on the side of the stop is provided a lateral seat $h^4$, upon which the edge of the plate rests, as seen in Fig. 10, which provides a support for the edge of the plate in this way. The stop $h$ is also provided with lateral lugs $h^5$ $h^6$, which loosely fit into the transverse slots $a^3$ $a^3$ to prevent end movement of the stop. This whole arrangement provides a simple and effective means of taking the pressure of the plate and holding it down firmly upon the holder while giving the edge thereof a solid support, as seen in Fig. 10 and as can be understood without further explanation.

The end stop $i$ has the rack $i'$ projecting at right angles therewith and from its lower surface and the teeth of which engage with those of a corresponding rack-bar $j$, having the lateral projecting lugs $j'$ $j^2$ and, as seen in Figs. 14 and 15, detached from each other.

The rack-bar construction of the parts $i\,j$ admit of an adjustment corresponding to the pitch of the teeth and the length of the racks for the end stop $i$. The lugs $j'\,j^2$ fit loosely in the slot transverse with the bar, thus preventing end motion of the latter, while the under surface of the plate rests upon the upper surface of the rack $i'$, as seen in Fig. 13, thus preventing the device from rising out of the slots in which it is placed. The plate in this way holds the stop down in position upon the holder and the plate itself being held down by the action of the clamps and side stop mechanism, as seen in Fig. 9.

The holder may be made of metal or any other suitable material and all the parts made integral or secured together, as may be found most desirable. The edges of the sections of the holder are provided with removable dowel-pins $k\,k$, which fit into corresponding holes $k'\,k'$ in the holder, and thus lock the sections together, so that the slots will register with one another in the sections thus united. The frame $l$ has mortise-and-tenon joints at the corners and in each of which is provided a screw-pin $l'$ to secure the parts together and which can be understood without further explanation. (See Fig. 1.) The support $m$ is provided to support a portion of a plate that may project over a slot in the holder and have no other means of withstanding any heavy pressure that may be applied thereon incidental to the printing operation. It may be of any desired dimensions and shaped so as to fit loosely into the slots at any intersection thereof and be of a height equal to their depth. It is provided with side notches $m'\,m'$ to facilitate its removal from the holder when not in use. Its cross-shaped form is for the purpose of preventing it from moving out of position in the holder when it is used. The surfaces of the squares between the slots of the holder may be ruled, as shown in Fig. 9, and in which the lines are supposed to be twelve points, or one pica, apart.

$n$ represents an adjustable folder-point that may be inserted in the clamp-screw mechanism for the purpose of perforating the sheets of paper during the printing operation, so as to furnish guides to a bookbinder to register the fold in the sheets in the operation of folding with a folding-machine. By substituting a screw for the rivet, as indicated by the dotted lines in Fig. 17, a lateral adjustment may be given to the point $n$ equal to the sweep it can make around the said screw.

The right and left hand clamp-screws may be designated by having the clamps differently colored, shaped, or marked to distinguish them at a glance when being used.

The operation of my improved holder will now be explained. When it is necessary to mount a plate upon the holder, the requisite number of clamps are placed in the slots of the holder all complete and together, as seen in Figs. 16, 17, 18, and 19, and in an approximately proper distance apart to take the plates and as shown in Figs. 1, 3, and 9. The plate is then placed upon the holder between the clamps, and the latter are screwed firmly against the edges of the plate by turning their respective pinions by means of the hand rack-bar $g$, which is moved in the proper direction in the slot and over the pinion or pinions of the screw or screws to be thus adjusted. The pitch-line of the hand rack-bar $g$ is below the top surface of the holder on account of the diameter of the pinions being of the requisite dimensions to admit of this, and this causes the slot to act as a guide for the hand rack-bar to move in and over any pinion or pinions in the same slot. This arrangement of the parts enables a printer to close or open the clamps with reference to the plate very quickly and when the "margin" between the plates is close or narrow, and by making the screws with right-hand and left-hand threads for opposite plates, respectively, the release of a number of plates can be effected very quickly with a few quick movements of the hand rack-bar. The slots being at right angles with the edges of the holder enables the printer to set the plates in accurate and correct alinement thereon and while it is in position upon the bed of a printing-press and which is of great advantage. The slots are arranged in the holder so that they register corresponding to what is known as the "point system" in the printing-trade and the advantages of which in adjusting the plates upon a holder are correspondingly very great. The point system is a standard of measurement of the bodies of type, one point being equal to .0138 of an inch, nonpareil type measuring six points, pica measuring twelve points, and so on. Pica type is the standard unit of measurement in the printing-trade for the thickness and length of leads, rules, &c.—as, for instance, a six-to-pica lead, a page twenty-four picas wide, and the like. The slots in the holder are one pica in width and four picas (or forty-eight points) from center to center, thus leaving the intervening squares three picas, or about a half-inch, in size. If a plate is to be set on the holder at an oblique angle with the edges of the holder, as shown at $b^2$ in Fig. 1, the swivel form of construction of the clamp shown in Fig. 17 will allow the clamp to adjust itself against the edge of the plate accordingly, and as several are shown as securing the plate $b^2$ in the holder in Fig. 1. If the side or end stops $h\,i$ are to be used, they are inserted in the slots, and the plate is laid upon the holder and against them near their upper edges, as seen in Fig. 9, and the portions projecting under the plate, as indicated by the dotted lines, will cause them to be held down in position by the plate, while the stops hold the plate in position thereon on account of the opposite edges of the plate being held down upon the holder and forced against the stops, as indicated in Figs. 9, 10, 13, respectively. The lugs $h^5$ $h^6$ and $j'$ $j^2$ of the stops $h$ and $i$, fitting in the slots of the holder, as they do, prevent any end movement of the stops that might otherwise occur while the devices were in use. The toothed arrangement of the rack portions of the end stop $i$, as shown in Figs. 13, 14, 15, gives a limited means of adjustment of the stop corresponding to the pitch of the teeth thereon, and by reversing the lower part $j$ in the slot in which it is to be placed an adjustment equal to one-half of the distance of the pitch of the teeth can be obtained on account of the relative position of the lugs $j'$ $j^2$ with reference to the part $j$, which is determined accordingly. When a portion of the plate projects over the slot and it requires support in the printing operation, the support $m$ is inserted in the slot and the plate then adjusted so as to rest upon it at the point to be supported, as seen in Fig. 5, and the desired result is thereby obtained, while the laterally-projecting portions of the support registering at the intersection of the slots, as they do, will prevent any movement of the stop while it is thus in use. The tumbler $e$ can be brought into a vertical position preparatory to removing the clamp device from the holder by moving it accordingly with a penknife, screw-driver, or similar tool, which can be inserted in the notch $e^3$ of the tumbler $e$, provided for the purpose. The notches $m'$ $m'$ in the support $m$ are provided thereto and for a similar purpose, or in order to lift the clamp device up vertically out of the slot, as hereinbefore stated, the same or the tumbler portion alone may be grasped by a pair of small pliers passed down into the slot. When a large plate is to be mounted upon a holder, the latter can be made up from sections into corresponding size and the slots will come together in proper alinement on account of the position of the dowel-pins $k$ $k$ with reference to the holes $k'$ $k'$ in the sections and which are located accordingly. When the plates are arranged closely together—that is, with small "margin" between them, as seen in the upper portions of Fig. 1—all of the intervening clamp-screws can be turned so as to release or bind the plates with one movement of the hand rack-bar, providing the screws facing in opposite directions are made with right-hand and left-hand threads, respectively. The delicacy and accuracy obtained in moving the clamps which is provided through the screws with their respective pinions, while at the same time giving a positive and secure grip upon the plate with the holder, is effected by the use of the hand rack-bar and which is not new, but is now in general use by printers.

The advantages of my improved holder are that on account of its sectional construction it can be made of any dimensions or shape to suit the size or position in which the plate or plates are to be mounted thereon and that it can be moved readily and cleaned. The construction of the clamps admits of their being adjusted to any position on the holder by simply inserting them into the slots from the top of the holder; their automatic tumbler-locking action, together with their fine, accurate, and positive lateral adjustment; the novel construction of the side stops and end stops and supports, all of which can likewise be adjusted in their proper and desired position into the slots and from the top of the holder; the arrangement of the slots at right angles with the edges of the holder and with each other and upon the "point system" of measurement, which facilitates the adjustment of the plate or plates thereon while being upon the bed of a printing-press; the pinion and hand rack-bar mechanism which facilitates the accurate adjustment of the plates and their rapid release from the holder when desired, and the detachable frame, which permits of the sections of the holder being quickly and effectively locked up together.

The close proximity of the slots with each other and the narrow dimensions of the slots admit of securing the plates on the holder with the smallest margin required for book and job printing. When plates of illustrations are being printed and the pressure thereon is very great, the support given to the plates by the supports in the slots is of great advantage in preventing the plate from yielding to the pressure it is undergoing during the operation of printing. In the case of light pressure incidental to the use of plates of text only the limited width of the slots obviates the necessity of using any support. As constructed, however, the holder will stand any ordinary pressure incidental to printing the plates thereon without any damage to the plates or the necessity of using the supports. The clamp-tumbler is longer than the width of the slots, so that the operation of the clamp-screw mechanism cannot throw the tumbler out of alinement with the slot while passing a transverse slot during the manipulation of the clamp-screw. The end of the screw is riveted over in practice to prevent the tumbler or clamp from being unscrewed or separated therefrom, and the lower portion of the clamp projects under the upper projecting portion of the tumbler to prevent the latter from being separated from the clamp. The head of the screw takes the longitudinal thrust of the hand rack-bar in the act of manipulating the screw by coming in contact with the sides of the slot. The slots are arranged in the holder in such a manner as to bring the contiguous slots of adjoining sections the same distance from each other as the other slots in the sections are from each other. This arrangement provides for broad surfaces on the edges of the sections when brought together in uniting two or more of them as a larger section, and also gives the widest dimension of section obtainable to take the end thrust of oppositely-acting clamp-screws and for the use of the side and end stops, respectively. The arrangement of the slots upon the point system of measurement results in giving a printer an accurate guide, so he can make up the margin of a book without the aid of a rule when he knows the width of a plate.

The device is especially advantageous for photo-engravers and electrotypers, as the height of the holder may be increased so that together with the thickness of an original engraved plate it will be type-high, thus obviating the necessity of blocking the plate on wood or metal.

Sometimes in printing—say a book, for instance—the "back" margin of the book may be very narrow and it may be found desirable not to disturb the position of the clamps between the two continuous plates, as shown at $b^3$ $b^4$ in Fig. 1, and yet it may be necessary to move or adjust the outer opposite clamps securing said plates or even the plates themselves. In such a case the clamps to be left undisturbed are first set in the proper position and then the plates are laid upon the holder over the pinions of the clamp-screws, thus covering them up, as seen in Fig. 2, and rendering it impossible to disturb the position of the clamps by accident or otherwise until the plates are again removed. This is one of the advantages of this form of clamp construction, and, so far as I know, is exclusive to this invention. This feature also shows the exceedingly close or narrow margin that can be obtained by the aid of my improved clamps for any purposes where such a narrow margin may be required.

In the drawings the plate-holder is shown as being adapted for use on a flat-bed printing-press; but it can be understood that when the plates are to be printed from a curved support, such as the cylinder of a printing-press, the holder can have its surfaces and slots correspondingly curved and the clamp mechanism and the stop devices and plate-supports can be correspondingly curved and shaped to fit such modification of construction and without departing from the principle of construction involved in this invention. In such a case the principle of curvature, as applied to the holder, can be so extended as to admit of the holder forming the entire outer portion of the cylinder, or to comprise of such portions of the same as may be desired. In this way the holder can be made in the form of a complete cylinder and substituted for a plain cylinder of a rotary printing-press, such as a web-press or the like.

It can thus be seen that I provide a complete device for the purposes intended, and which can be understood without further description.

Having thus described my invention, what I claim, and desire to secure by Letters Patent, is—

1. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position in and longitudinally of said slot, a clamp-block having an edge lip for engaging the printing-plate and perforated and interiorly threaded to receive said screw-stem and adapted to snugly fit the slot of the said bed and to be moved longitudinally therein by the rotation of the pinion and screw, and a means for preventing the accidental separation of said clamp device from the slot of said bed.

2. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position in and longitudinally of said slot, a clamp-block having an edge or lip for engaging the printing-plate and perforated and interiorly threaded to receive said screw-stem and adapted to snugly fit the slot of said bed and to be moved longitudinally therein by the rotation of the pinion and screw, means for preventing the accidental separation of said clamping device from the slot of said bed, and means also adapted to fit down in the slots of said bed and to take a bearing in the bed against the thrust action of the said screw-stem in clamping the printing-plate.

3. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position down in and longitudinally of said slot, a clamp-block received upon and movable longitudinally of said stem and also adapted to fit snugly down into said slot and be movable longitudinally therein, an edge or lip upon said clamp-block and rising above and extending across the said block above the surface of the printing-plate for engaging said printing-plate, and a device associated with said clamp-block and adapted to engage the slot of said bed for preventing the accidental separation of the clamp device from the slot of said bed.

4. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position down in and longitudinally of said slot, a clamp-block received upon and movable longitudinally of said stem and also adapted to fit snugly down into said slot, and be movable longitudinally therein, an edge or lip upon said clamp-block rising above and extending across the said block above the surface of the printing-plate for engaging said printing-plate, a device associated with said clamp-block and adapted to engage the slot of said bed for preventing the accidental separation of the clamp device from the slot of said bed, and a plate associated with the pinion and extending across the screw-stem fitting down into the slot of the bed and taking a bearing in the bed against the end thrust of the clamp device in securing the printing-plate in position.

5. A clamp device for a printing-plate holder, adapted to be placed down into the slots of a printing-plate and taken therefrom by a movement at right angles to the plane of the plate consisting of a screw, a pinion adjacent to one end of the screw, a bearing-plate associated with and extending across the screw adjacent to the pinion, a clamp-block threaded to receive said screw and movable longitudinally thereon and having an edge or lip for engaging the printing-plate, and means associated and coacting with said parts and adapted to prevent the accidental removal of said clamp device, substantially as specified.

6. The combination in a bed for printing-plates having undercut and shouldered slots in opposite directions and at right angles to one another, of a clamp device for securing printing-plates to said bed adapted to be placed down into any of said slots and removed therefrom, said clamp device essentially comprising a pinion, a screw-stem connected to the pinion and adapted to occupy a position in and longitudinally of said slot, a clamp-block having an edge lip for engaging the printing-plate and perforated and interiorly threaded to receive said screw-stem and adapted to snugly fit the slot of the said bed and to be moved longitudinally therein by the rotation of the pinion and screw, and a means for engaging the undercut shouldered portion of said slots for preventing the accidental separation of said clamp device from the slot of said bed.

7. A clamp mechanism for a bed for printing-plates having a slot-connecting detent-acting tumbler device combined therewith, substantially as specified.

8. A clamp mechanism for a bed for printing-plates having a clamp-slot therein, consisting of the clamp and a detent-acting tumbler device adapted to engage in the slot and thereby secure the clamp to the bed, substantially as specified.

9. A clamp mechanism for a bed for printing-plates having clamp-slots therein, consisting of a clamp, a detent-acting tumbler and a screw, the screw provided with means for its adjustment and fitted to the clamp and tumbler and connecting them together, substantially as specified.

10. In combination with a bed for printing-plates having clamp-slots therein at right angles with each other, and of dimensions in width and apart corresponding to the pica system of measurement, a clamp mechanism constructed so as to be insertible in said slots at the point of their intersection in the plate-bed and being provided with a detent-acting tumbler means for being secured thereto when thus inserted in said slots and having a lateral adjusting-screw device, substantially as specified.

11. In combination with a bed for printing-plates having clamp-slots therein at right angles with each other, a clamp mechanism constructed so as to be insertible in said slots at the point of their intersection in the plate-bed and being provided with a detent-acting tumbler means for being secured thereto when thus inserted in said slots and having a lateral adjusting-screw device, substantially as specified.

12. In combination with a bed for printing-plates having clamp-slots therein at right angles with each other, a clamp mechanism provided with a tumbler and lateral adjusting-screw and constructed so as to be insertible in said slots at the point of their intersection in the plate-bed, substantially as specified.

13. The folder-point device for a bed for printing-plates having clamp-slots therein, provided with a tumbler and a lateral adjusting-screw connecting the point and the tumbler together, substantially as specified.

14. In combination with a bed for printing-plates having clamp-slots therein, a folder-point device provided with a tumbler and a lateral adjusting-screw connecting the folder-point and the tumbler, substantially as specified.

15. The clamp device for a printing-plate holder consisting of the clamp, the tumbler, and the screw, and the clamp and tumbler being connected to the screw, and all combined, substantially as specified.

16. The clamp device for a printing-plate holder consisting of the clamp, the tumbler, and the screw provided with a pinion-head, and the clamp and tumbler being threaded and fitted to the screw and all combined, substantially as specified.

17. The clamp device for a printing-plate holder, consisting of the clamp having a swivel-head, the tumbler having the lateral flanges on its upper extremity, and the screw provided with a pinion-shaped head and the tumbler and clamp being threaded to fit the screw and all combined, substantially as specified.

18. In a printing-plate holder having a longitudinal clamp-slot having side slots therein, the combination therewith of a plate-clamp device provided with a tumbler having lateral flanges in its upper extremity which are adapted to engage with the side slots in the clamp-slot in the holder and the clamp and tumbler being provided with a screw fitted to the clamp and tumbler mechanism and having a pinion-head and a washer fitted thereto and the pinion-head of the screw and the washer adapted to fit in a transverse slot in the holder and adapted to give a lateral means of adjustment to the clamp, substantially as specified.

19. In combination with a bed for printing-plates having clamp-slots therein at right angles with each other, a folder-point mechanism provided with a tumbler and lateral adjusting-screw and constructed so as to be insertible in said slots at the point of their intersection in the plate, substantially as specified.

20. In a printing-plate holder the combination therewith of the end stop $i$, having the rack-section $i'$, in combination with the rack-section $j$, having the slot-registering lugs, $j'$, $j^2$, substantially as specified.

21. In a printing-plate holder having slots therein, the combination therewith of the side stop $h$, having the lateral projecting rib $h'$, adapted to fit in corresponding lateral slots in the clamp-slots in the holder and being provided with the laterally-projecting lugs $h^5$, $h^6$, substantially as specified.

22. A side stop $h$, for a printing-plate holder having a lateral projecting rib $h'$ on one of its sides and the lip $h^3$, and the shoulder $h^4$ upon its opposite side, the shoulder adapted to support the edge of the plate and the stop being provided with the laterally-projecting lugs $h^5$ $h^6$, substantially as specified.

23. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position in and longitudinally of said slot, a clamp-block having an edge lip for engaging the printing-plate and adapted to snugly fit the slot of the said bed and to be moved longitudinally therein by the rotation of the pinion and screw, and a means for preventing the accidental separation of said clamp device from the slot of said bed.

24. The combination in a bed for printing-plates having slots crossing in opposite directions, of a clamp device for securing printing-plates to said bed adapted to be placed down into any of said slots and taken therefrom by a movement at right angles to the plane of the plate, said clamp device essentially comprising a pinion, a screw-stem connected to the pinion and adapted to occupy a position in and longitudinally of said slot, a clamp-block having an edge or lip for engaging the printing-plate and adapted to snugly fit the slot of said bed and to be moved longitudinally therein by the rotation of the pinion and screw, means for preventing the accidental separation of said clamping device from the slot of said bed, and means also adapted to fit down in the slots of said bed and to take a bearing in the bed against the thrust action of the said screw-stem in clamping the printing-plate.

Signed by me this 24th day of March, 1905.

CHARLES F. ROCKSTROH.

Witnesses:

GEO. T. PINCKNEY,
CHAS. H. SMITH.